Figure 1:
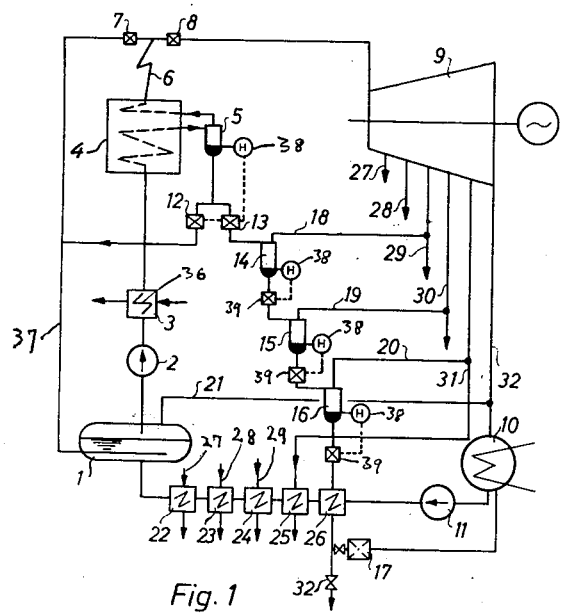

Nov. 14, 1961

P. PROFOS 3,008,295

STEAM POWER PLANT

Filed April 21, 1959

INVENTOR.
Paul Profos
BY
Pennie, Edmonds, Morton, Barrows & Taylor
ATTORNEYS

United States Patent Office 3,008,295
Patented Nov. 14, 1961

3,008,295
STEAM POWER PLANT
Paul Profos, Winterthur, Switzerland, assignor to Sulzer Freres, Societe Anonyme, Winterthur, Switzerland, a Swiss company
Filed Apr. 21, 1959, Ser. No. 807,942
Claims priority, application Switzerland Apr. 21, 1958
2 Claims. (Cl. 60—67)

The present invention relates to a closed circuit, condensing steam power plant including a forced circulation boiler which develops superheated steam and a multistage turbine or other steam consuming machine. The invention provides a plant of this type including a plurality of economizers or feed water heaters connected in series between the condenser and the evaporator section of the boiler, each of these economizers being supplied with heat by means of a mixture of steam tapped from an appropriate stage in the turbine with steam taken from a water separator. To this end a series of separators are provided, the water output of each supplying the water and steam input to the next and the steam output of each being mixed with steam at substantially the same pressure tapped from the turbine for the supply of heat to one of the economizers. The input to the first of these separators comes from the evaporator section of the boiler, preferably through an initial separator, and preferably at the end of the evaporator adjacent the beginning of the superheating zone of the boiler, and the working substance so withdrawn is thus reduced in pressure in a plurality of stages each comprising a separator, at each of which a separation into water and steam takes place.

In a steam power plant including a forced circulation boiler it is of course known to provide a water separator between the evaporating and superheating surfaces of the boiler. This device provides an unambiguous indication of the state of aggregation of the working substance (e.g. water and steam) at a fixed location in the boiler tube system, and in addition it serves to remove with the water extracted thereby the salts concentrated in that water by the evaporation process.

A discussion of the considerations here relevant is contained, for example, in the article entitled "The Action of the Water Separator in the Sulzer Monotube Steam Generator" appearing at pages 14 to 21 of the Sulzer Technical Review, No. 1 of 1951. A description of a water separator is also given there. Figure 20 of this article shows that the ratio of the concentration of salts in the water extracted at the separator to the concentration of salts in the feed water declines with increasing boiler pressure. Thus the maximum of this ratio (which for a given boiler pressure is a function of the percentage of the water separated, as that Figure 20 indicates) is reduced by a factor of about 4 to 1 upon an increase in boiler pressure from 50 to 200 atmospheres absolute. Moreover with increasing boiler pressure the maximum of the function shifts for a given pressure in the direction of higher percentages of extracted water. This means that if the boiler is to be operated with a constant level of desalting or purification, the amounts of water removed in the separator will have to increase substantially as the operating pressure is raised. An object of the present invention accordingly is the provision of a steam power plant in which the removal by separation of increasing amounts of water with increasing boiler pressure may be achieved with minimum thermodynamic losses. A further object of the invention pertains to the provision of adequate feed water preheating, which requires increasing amounts of heat as the operating pressure is raised.

It is known boiler practice to pass the feed water through a succession of economizers connected in series, these economizers being heated at least in part by steam drawn off from the turbine. According to the stage in the turbine at which this steam is drawn off, it is in a state of greater or lesser superheat, and, as is known, the heat transfer coefficient between steam and a condensing surface declines for a given temperature difference with increasing degree of superheat. In systems such as those presently contemplated which employ superheated steam for feed water preheating, this factor tends to require large heat transfer surfaces in the economizers, contributing importantly to increased material and constructional costs as operating pressures rise.

The invention provides a steam power plant minimizing both of these disadvantages of increasing steam pressure. According to the invention the steam tapped from the various stages of the turbine for feed water preheating is at each pressure level mixed with the steam drawn off at one of a plurality of separators, the arrangement being such that the superheated steam so drawn from the turbine is in each case mixed with steam from a separator at the same pressure.

In the steam plant of the invention, the heat content of the working substance separated (e.g. water and steam) is reinserted into the circuit of the working substance with minimum losses by the avoidance, by means of the invention, of wasteful throttling and expansion of at least the vapor phase of the extracted water. Moreover by expansion of the extracted working substance in successive stages there is obtained a substantial increase in the salt concentration of the residual water at each stage and hence overall. In addition the heat transfer coefficient applicable in the economizers, which is of controlling importance on the dimensioning of the heat exchange surfaces therein, is raised by mixing the superheated steam from the turbine, before applying it to the economizers, with the saturated steam drawn off from the various successive separators.

Advantageously moreover in a plant according to the invention the residual water obtained in the final extracting stage or separating stage is sent through a desalting device and then returned to the flow circuit of the working substance.

Figure 2:
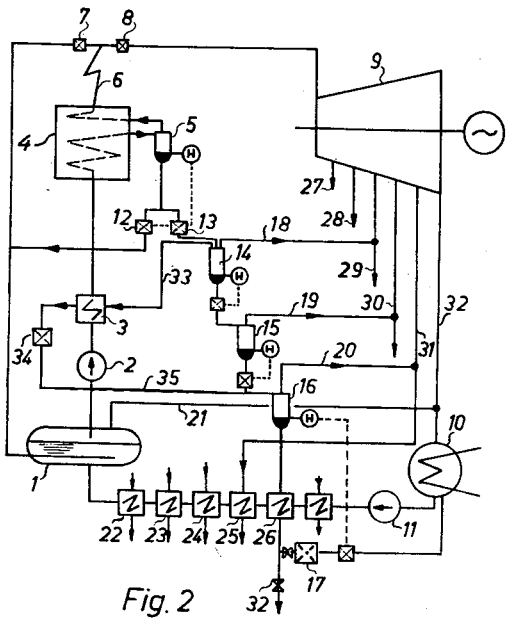

The invention will now be described in further detail by reference to the accompanying drawings, in which:

FIG. 1 is a diagram of one form of steam power plant according to the invention; and FIG. 2 is a diagram similar to FIG. 1 but illustrating a modification of the embodiment of FIG. 1, also falling within the scope of the invention.

In FIG. 1 a feed water storage drum is shown at 1. 2 indicates a feed water pump and 3 a high pressure feed water preheater or economizer. In preheater 3 there is diagrammatically shown at 36 a heating tube or coil through which the feed water passes from pump 2 to evaporator 4, and which is heated by the passage thereover of steam from line 27, as will be presently described.

From the preheater 3 the feed water passes to an evaporator 4 to which is connected a water separator 5. Practically dry steam separated out in the separator 5 is returned to the evaporator 4 and from thence passes through a superheater 6 which may be a final superheater, it being within the scope of the invention to include additional superheaters, for example between the steam return from separator 5 and the input end of superheater 6. From the superheater 6 the steam passes during normal operation of the system through a valve 8 to the high pressure end of a turbine 9. From the low pressure end of the turbine the working substance passes through a line 32 to a condenser 10. A condensate pump 11 then drives the condensate through the economizers 26, 25, 24, 23 and 22, from the last of which it passes into the feed water storage drum 1.

During firing up, the water separated out by the separator 5 is sent through a bypass valve 12 and a return line 37 back to the drum 1, valve 13 being closed. Under conditions of normal operation on the other hand valve 12 is closed and the water separated out in separator 5 passes through valve 13 into a second separator 14 from which the separated and substantially saturated steam passes through a line 18 for mixing in a line 29 with superheated steam drawn from the turbine 9 at an appropriate stage therein where the pressure is the same as that of the steam in line 18. Line 29 connects with economizer 23, to heat the feed water passing therethrough. Separator 5 may include, for automatic control of valves 12 and 13, a regulating device 38, shown coupled by a dashed line to those valves, and which may be responsive to temperature and/or pressure and/or water level conditions in the separator vessel. Suitable apparatus for use in such a regulating device is disclosed in my copending application Serial No. 798,418 filed March 10, 1959. Alternatively the valves 12 and 13, and the corresponding single valve 39 in the water outlet of each of the separators 14, 15 and 16 presently to be referred to, may be manually controlled.

The water separated out in the second separator 14 passes into a third separator 15 where in similar fashion the saturated steam is drawn off, this time at a line 19, for mixing with superheated steam drawn at a line 30 from a lower pressure stage in the turbine. The mixture thus developed in the line 30 is applied to the economizer 24, disposed at a lower temperature point in the cascade of economizers between the feed water drum 1 and the condenser 10.

The water separated at separator 15 in turn provides the input to a separator 16 whose steam output at line 20 is applied via line 31 with an admixture of superheated steam drawn from a still lower stage in the turbine to the economizer 25 on the low temperature side of economizer 24. Lastly, in the particular arrangement illustrated, the water extracted in the separator 16 is applied to the lowest temperature economizer 26. From the non-feed water outlet of economizer 26 the water separated out in separator 16 may be passed through a desalting device 17 and thence returned to the condenser 10. In similar fashion the water at the outlet ends of the other economizers 22, 23, 24, 25 and also economizer 3 may be passed through device 17 and returned to the circuit. Alternatively, the waste water from the various economizers may be discarded, as at a valve 32 shown connected to the output heating line of economizer 26.

In the particular embodiment illustrated the highest temperature economizer 22 in advance of the feed water drum is heated with steam drawn from the turbine at a line 28, connecting into the turbine at a higher pressure level than the line 29. A line 27 taps the turbine at a still higher pressure level for heating of the final economizer 3.

The system may be so designed that the saturated steam extracted from the second separator 14 appears at a pressure higher than the highest bleed-off 27 from the turbine. In such a case it is advantageous to modify the system to the form shown in FIG. 2 in which the steam extracted at the separator 14 is applied in whole or in part (as shown) to the final preheater 3. The condensate developed from line 33 in the preheater 3 may then be collected in a tank 34 and passed through a line 35 to the input of one of the separators 14, 15 and 16 of lower operating pressure for further expansion.

While the invention has been illustrated and described herein in terms of two preferred embodiments, it is not limited thereto, the scope of the invention itself being set forth in the appended claims.

I claim:
1. A steam power plant comprising a forced circulation boiler having an evaporator and a superheater connected in series therewith, a plural-stage steam consuming machine, a plurality of feed water preheaters connected in series between said machine and evaporator, a plurality of water-steam separators operating at successively lower pressures, each of said separators having a water-steam inlet, a water outlet, and a steam outlet, said plant further comprising means connecting the water outlet of each of said separators, except the last thereof, to the inlet of the next, means connecting the inlet and the steam outlet of the first of said separators in series with said evaporator and superheater in advance of said superheater, separate means connecting the steam outlet of each of said separators following the first thereof to a separate one of said preheaters, and means to supply to each of said last-named preheaters simultaneously with the steam from a corresponding one of said separators superheated steam withdrawn from said machine at a pressure substantially equal to the pressure of the steam supplied to such preheater from the corresponding one of said separators, whereby each of said preheaters is heated with a mixture of separator and turbine-bled steam.

2. A steam power plant comprising a forced circulation boiler having an evaporator and a superheater in series therewith, a plural-stage steam consuming machine, a plurality of feed water preheaters connected in series between said machine and evaporator, a plurality of separators operating at successively lower pressures for the separation of water from steam and for the concentration in water of salts dissolved in the steam-water mixture supplied to such separators, each of said separators having a water-steam inlet and separate water and steam outlets, said plant further comprising means connecting the water outlet of each of said separators, except the last thereof, to the inlet of the next, means connecting the inlet and the steam outlet of the first of said separators in series with said evaporator and superheater in advance of said superheater, separate means connecting the steam outlet of each of said separators following the first thereof to a separate one of said preheaters, and means to supply to each of said separate ones of said preheaters simultaneously with the steam from a corresponding one of said separators superheated steam withdrawn from said machine at substantially the same pressure as the steam supplied to such preheater from the corresponding one of said separators, whereby each of said preheaters is heated with a mixture of separator and turbine-bled steam and the salts dissolved in the steam-water mixture supplied to the first of said separators are concentrated in the water delivered at the water outlet of the last of said separators.

References Cited in the file of this patent
UNITED STATES PATENTS

| | | |
|---|---|---|
| 2,066,151 | Johansson | Dec. 29, 1936 |
| 2,384,587 | Badenhausen | Sept. 11, 1945 |
| 2,900,792 | Buri | Aug. 25, 1959 |

FOREIGN PATENTS

| | | |
|---|---|---|
| 1,021,451 | France | Feb. 19, 1953 |
| 416,316 | Germany | July 14, 1925 |